United States Patent
Bolen (10) Patent No.: US 7,529,836 B1
(45) Date of Patent: May 5, 2009

(54) TECHNIQUE FOR THROTTLING DATA ACCESS REQUESTS

(75) Inventor: David Brittain Bolen, Wake County, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 910 days.

(21) Appl. No.: 10/753,750

(22) Filed: Jan. 8, 2004

(51) Int. Cl.
G06F 15/173 (2006.01)

(52) U.S. Cl. ....................... 709/226; 709/234

(58) Field of Classification Search ................. 709/226, 709/234
See application file for complete search history.

(56) References Cited

U.S. PATENT DOCUMENTS

| | | | |
|---|---|---|---|
| 5,666,511 A * | 9/1997 | Suganuma et al. ........ 711/114 |
| 5,819,292 A | 10/1998 | Hitz et al. | |
| 5,963,962 A | 10/1999 | Hitz et al. | |
| 6,038,570 A | 3/2000 | Hitz et al. | |
| 6,341,304 B1 * | 1/2002 | Engbersen et al. ........ 709/203 |
| 6,618,389 B2 * | 9/2003 | Hoefelmeyer et al. ...... 370/401 |
| 6,683,884 B1 * | 1/2004 | Howard ................... 370/412 |
| 6,757,273 B1 * | 6/2004 | Hsu et al. ................. 370/349 |
| 2002/0071386 A1 * | 6/2002 | Gronke ..................... 370/217 |
| 2002/0146022 A1 * | 10/2002 | Van Doren et al. ......... 370/412 |
| 2003/0101316 A1 * | 5/2003 | Krishnamurthy ........... 711/114 |
| 2005/0076113 A1 * | 4/2005 | Klotz et al. ............... 709/224 |

OTHER PUBLICATIONS

Liu et al., "Prevention of congestion in packet-switched multistage interconnection networks", Parallel and Distributed Systems, IEEE Transactions on vol. 6, Issue 5, May 1995 pp. 535-541.*
Sobe, P."Concurrent updates on striped data streams in clustered server systems", Parallel and Distributed Processing Symposium., Proceedings 15th International Apr. 23-27, 2001.*
U.S. Appl. No. 10/086,657, filed Feb. 28, 2002, entitled System and Method for Clustered Failover Without Network Support, John A. Scott.
U.S. Appl. No. 10/672,260, filed Sep. 26, 2003, entitled System and Method for Failover Using Virtual Ports in Clustered Systems, Fang Wang et al.
U.S. Appl. No. 10/619,122, filed Jul. 14, 2003, entitled System and Method for Optimized LUN Masking, Herman Lee et al.
U.S. Appl. No. 10/811,095, filed Mar. 26, 2004, entitled System and Method for Proxying Data Access Commands in a Clustered Storage System, Herman Lee et al.
U.S. Appl. No. 10/421,576, filed Apr. 23, 2003, entitled Consistent Logical Naming of Initiator Groups, Mohan Srinivasan et al.

(Continued)

*Primary Examiner*—Patrice Winder
*Assistant Examiner*—William J Goodchild
(74) *Attorney, Agent, or Firm*—Cesari and McKenna, LLP (57) ABSTRACT

A system and method for throttling data access rates through data containers prevents starvation of storage system resources by active clients. A SCSI throttle module of a storage operating system of storage system determines if the number of outstanding access requests associated with the client or initiator group exceeds a preset throttle value.

40 Claims, 5 Drawing Sheets

OTHER PUBLICATIONS

Fielding et al., (1999) Request for Comments (RFC) 2616, HTTP/1.1.

Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

David Hitz et al., TR3002 File System Design for a NFS File Server Appliance published by Network Appliance, Inc.

* cited by examiner

TECHNIQUE FOR THROTTLING DATA ACCESS REQUESTS

FIELD OF THE INVENTION

The present invention relates to storage systems and, in particular, to storage systems that throttle data access rates.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including a storage operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level access to files and file systems. Storage of information on a NAS system is typically deployed over a computer network comprising a geographically distributed collection of interconnected communication links, such as Ethernet, that allow clients to remotely access the information (files) stored on the file server. The clients typically communicate with the filer by exchanging discrete frames or packets of data according to pre-defined protocols, such as the well-known Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the well-known Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

Conversely, a SAN is a high-speed network that enables establishment of direct connections between a storage system and its storage devices. The SAN may thus be is viewed as an extension to a storage bus and, as such, a storage operating system of the storage system enables access to stored information exported as, e.g., logical unit numbers (luns), using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server.

Conventionally, the storage system utilizes one or more FC host bus adapters (HBA) for interfacing with the FC media and clients of the storage system. Each HBA includes a set number of queues, such as 1024, for use in processing data access requests issued by the clients. Each data access request occupies one of the queues while the data access operation is specified by the request performed by the storage system. A noted problem with this arrangement art is a possibility of starvation of queues when the storage system is heavily utilized. Starvation occurs when, for example, all of the queues on an HBA are utilized by active clients that are sending large numbers of data access requests to the storage system. Active clients typically issue additional data access requests as soon as one of their previously pending requests completes. As a result, other less active clients may not have their access data requests processed and thus are prevented from utilizing storage system resources.

A solution to the starvation problem involves configuring a per adapter (HBA) "throttle" value. In the context "throttle" denotes a predetermined number of queues that may be allocated to the client. For example, if an HBA has 512 queues available for utilization by four clients, each client may be allocated 128 queues and have a corresponding throttle value of 128. However, there are a number of noted disadvantages with such a "client-side" throttle configuration solution. Specifically, each client is typically configured manually with an appropriate throttle value. Accordingly, whenever a client is added or removed from service by the storage system, all remaining clients require manual (re) configuration of their throttle values. Such manual configuration does not permit optimum storage system performance when, for example, a particular client is not utilizing its preallocated number of HBA queues. Because each client is manually configured with its throttle value, any unused queues may not be utilized by other clients of the storage system, even if the other clients experience an overly heavy load. This results in non-optimal system performance.

SUMMARY OF THE INVENTION

The present invention overcomes the disadvantages of the prior art by providing a data access requests from clients of a storage system without client-side configuration. The throttling technique involves configuring a per initiator group (igroup) throttle value on a storage system that defines a maximum number of queues that may be utilized by the clients in an igroup. A master throttle is provided for those clients not contained within an igroup having a set throttle value. If a client sends a data access request that causes the igroup of the client to exceed its throttle value, the storage system returns N queue full messages in response to the next N data access requests issued by any clients of the storage system. The value N is illustratively set as a percentage, e.g., 20%, of the total number of queues available. Since a queue full message is returned, regardless of the issuing client, active clients will be slowed and less active clients will not be affected as much. Upon receipt of a queue full message, a client reduces the issuance (i.e. slows the rate) of its data access rate down, which permits less active clients to complete required or requested input/output (I/O) operations and ensure that queues are available to process other igroups' data access requests.

In an embodiment of the present invention, a SCSI target module of the storage system includes a SCSI throttle module that implements the novel throttling technique. Upon receiving a data access request directed to a logical unit number (lun), the SCSI target module, it performs a conventional lun map operation to identify whether the client may access the requested lun. If so, the SCSI target module passes the data access request and igroup data structure identifying the igroup containing the requesting client to is the SCSI throttle module. The SCSI throttle module examines the throttle information contained within the igroup to determine if execution of an operation associated with the request will cause the number of queues allocated to the igroup to exceed its throttle value. If the number of data access requests will not result in consumption of queues exceeding the throttle value, the SCSI throttle module increments a throttle counter within the igroup data structure and returns a positive result to the SCSI target module, which performs the requested data access operation. After the data access operation has been completed, the SCSI target module "calls" the SCSI throttle module to decrement the throttle counter associated with the appropriate igroup.

However, if execution of the operation results in consumption of queues that exceeds the throttle value, the SCSI throttle module determines if a borrowing flag is set for the igroup. If the borrowing flag is set, an igroup is permitted to exceed its configured throttle value if there are unused queues available on the storage system. If borrowing is set for the igroup and the SCSI throttle module determines that there are available queues, then the operation is executed. However if borrowing is not set for the igroup or there are not available queues on the storage system, the SCSI throttle module returns queue full messages to the next N data access requests, which causes clients to slow their I/O rates to the storage system.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Multi-Protocol Storage Appliance Environment

Figure 1:
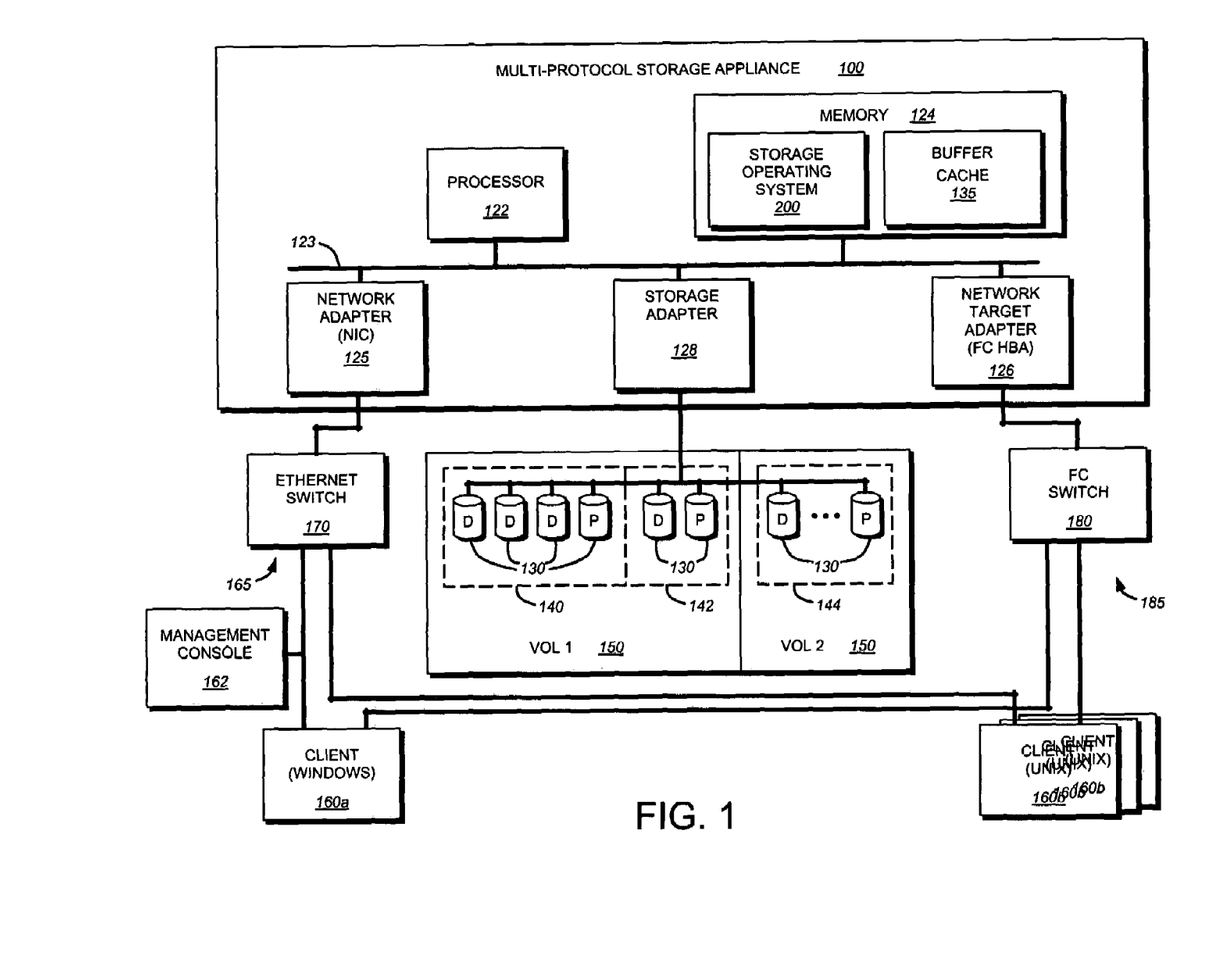
FIG. 1 is a schematic block diagram of a storage system environment in accordance with an embodiment of the present invention.

FIG. 1 is a schematic block diagram of a storage system 100 configured to provide storage service relating to the organization of information on storage devices, such as disks 130. The storage system 100 is illustratively embodied as a storage appliance comprising a processor 122, a memory 124, a plurality of network adapters 125, 126 and a storage adapter 128 interconnected by a system bus 123. The storage appliance 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the storage appliance 100 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures. The processor and adapters may, in turn, comprise processing elements and/or logic circuitry configured to execute the software code and manipulate the various data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory implementations, including various computer readable media, may be used for storing and executing program instructions pertaining to the inventive technique described herein.

The network adapter 125 couples the storage appliance to a plurality of clients 160a,b over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the appliance to a network switch, such as a conventional Ethernet switch 170. For this NAS-based network environment, the clients are configured to access information stored on the multi-protocol appliance as files. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol. On the other hand, a client 160b running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload Fibre Channel network processing operations for the storage appliance. Each HBA has a set number of queues for use in processing data access requests. When all queues are utilized, the HBA will not accept additional data access requests until one of the queues is freed by completing one of the outstanding data access requests.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a Node Name or a Port Name, consisting of an 8-byte number.

The storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

B. Storage Operating System

To facilitate access to the disks 130, the storage operating system 200 implements a write-anywhere file system as part of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file system based storage platform. The file system simplifies the complexity of management of the underlying physical storage in SAN deployments.

In the illustrative embodiment, the storage operating system is preferably the NetApp® Data ONTAP™ operating system available from Network Appliance, Inc., of Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The is storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
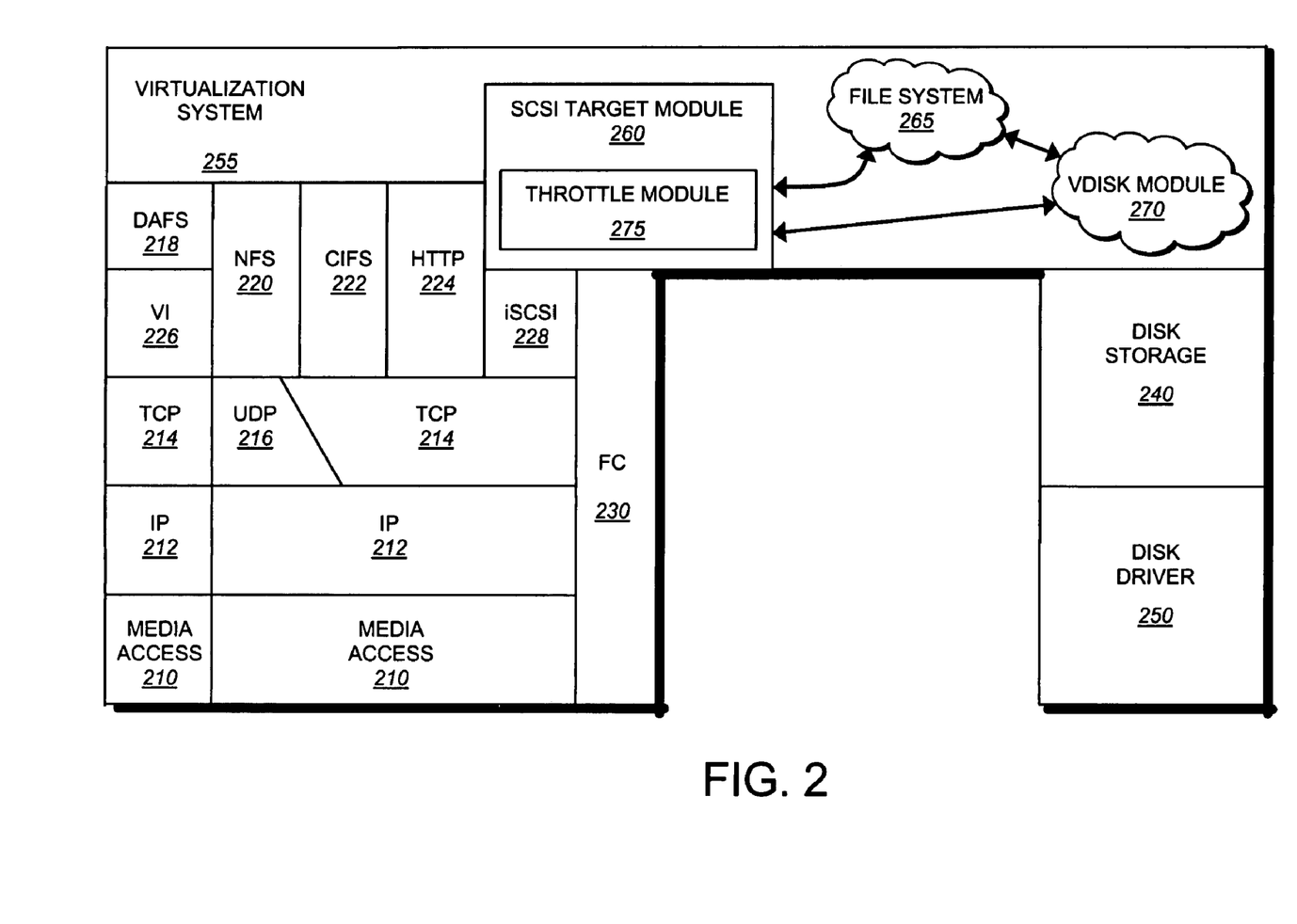
FIG. 2 is a schematic block diagram of an exemplary storage operating system for use with a storage system in accordance with an illustrative embodiment of the present invention.

FIG. 2 is a schematic block diagram of an exemplary storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as remote direct memory access (RDMA), as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Bridging the disk software layers with the integrated network protocol stack layers is a virtualization system 255. The virtualization system 255 is implemented, in the illustrative embodiment, by a file system 265 cooperating with virtualization modules illustratively embodied as, e.g., vdisk module 270 and SCSI target module 260. It should be noted that the vdisk module 270, file system 265 and SCSI target module 260 can be implemented in software, hardware, firmware, or a combination thereof. In essence, the vdisk module 270 manages SAN deployments by, among other things, implementing a comprehensive set of vdisk (lun) commands are converted to primitive file system operations ("primitives") that interact with the file system 265 and the SCSI target module 260 to implement the vdisks.

The SCSI target module 260, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the iSCSI and FC drivers 228, 230 and the file system 265 to thereby provide a translation layer of the virtualization system 255 between the SAN block (lun) space and the file system space, where luns are represented as vdisks. By "disposing" SAN virtualization over the file system 320, the storage appliance reverses the approaches taken by prior systems to thereby provide a single unified storage platform for essentially all storage access protocols.

The SCSI target module 260 includes a SCSI throttle module 275 that implements, in the illustrative embodiment, the novel throttling technique, described further below. The SCSI throttle module 275 may be implemented as a set of function calls that are accessible to the SCSI target module 260. Alternately, the SCSI throttle module may communicate via message passing or other conventional inter-process communication techniques.

The file system provides capabilities for use in file-based access to information stored on the storage devices, such as disks. In addition, the file system provides volume management capabilities for use in block-based access to the stored information. That is, in addition to providing file system semantics (such as differentiation of storage into discrete objects and naming of those storage objects), the file system 265 provides functions normally associated with a volume manager.

The file system 265 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which patent is hereby incorporated by reference as though fully set forth herein.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

C. Throttling Data Access to Luns

Figure 3:
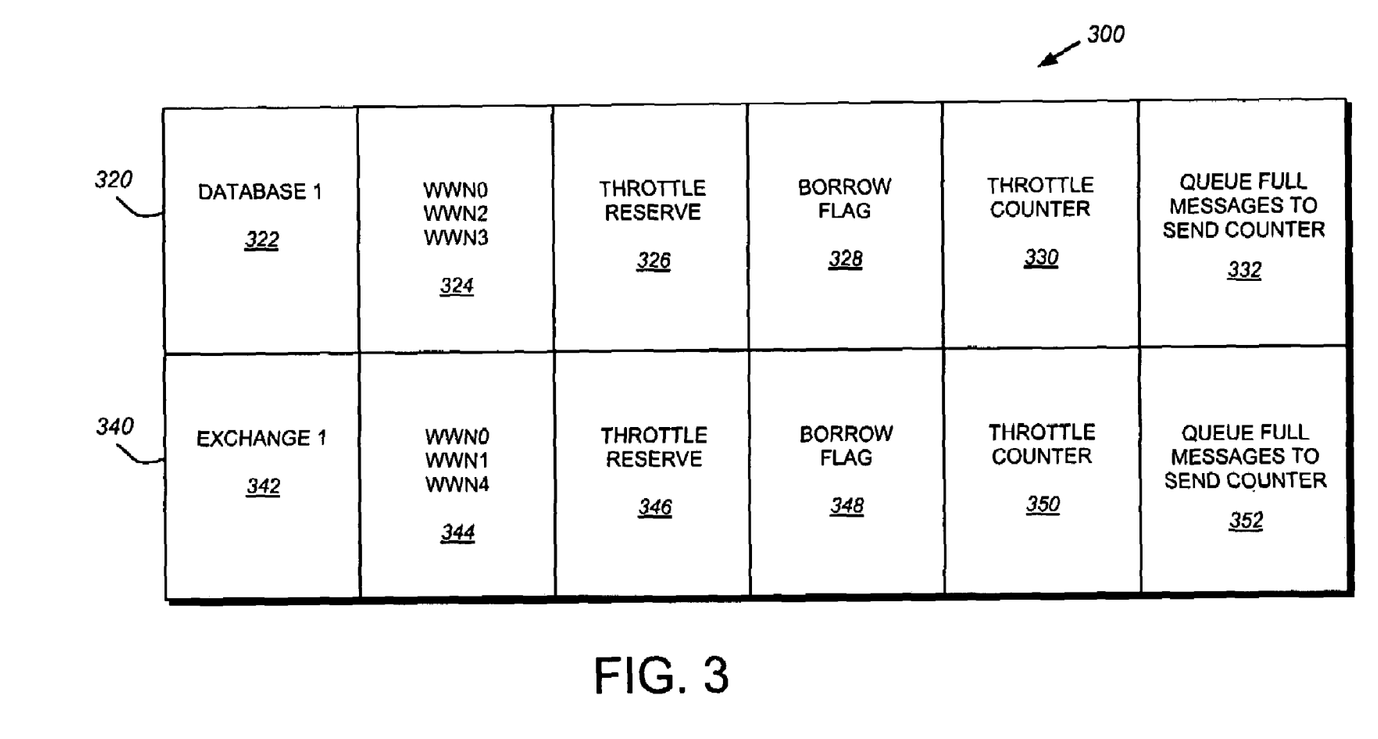
FIG. 3 is a schematic block diagram of an exemplary storage system initiator group data structure that may be advantageously used with the present invention.

The present invention is directed to a throttling technique that reduces the issuance of data access requests from clients to the storage appliance. In the illustrative embodiment, the throttle module 275 implements the throttling technique on a per initiator group (igroup) basis. An igroup is a logical named entity that is associated with addresses (e.g., FC WWNs or iSCSI names) of one or more clients. Igroups are further described in U.S. Pat. No. 7,293,152, entitled CONSISTENT LOGICAL NAMING OF INITIATOR GROUPS, by Mohan Srinivason, et al, issued on Nov. 6, 2007. FIG. 3 is a schematic block diagram of an igroup data structure 300 that may be advantageously used with the present invention. Each storage system igroup data structure 300 includes one or more entries 320, 340, each of which comprises an igroup name field address field and throttle information field. For example, igroup entry 320 comprises the igroup field 322 storing a name "database 1" that is associated with addresses in the address field 324, namely WWN0, WWN2 and WWN3. Also throttle information fields of entry 320 include a throttle reserve value 326, a borrow flag 328, a throttle counter field 330 and a counter for the number of queue full messages to send 332. The throttle reserve field 326 holds a value identifying a number of queues that should be reserved for the igroup. The storage appliance ensures that up to the number of queues in the throttle reserve are maintained for the igroup identified by the name and address fields 322, 324. The borrow flag 328 identifies whether the igroup may exceed the number of queues identified by a throttle reserve if there are available queues. A throttle counter in field 330 is utilized by the SCSI throttle module 275 to maintain a running count of the number of queues consumed by the igroup. The counter for the number of queue full messages to send 332 tracks the number of queue full messages to be sent to clients in response to data access requests in accordance with an illustrative embodiment of the present invention. It should be noted that the exemplary igroup 300 is for illustrative purposes only. Igroups may contain varying number of definitions, addresses and/or additional entries depending on the embodiment of the storage appliance.

Figure 4:
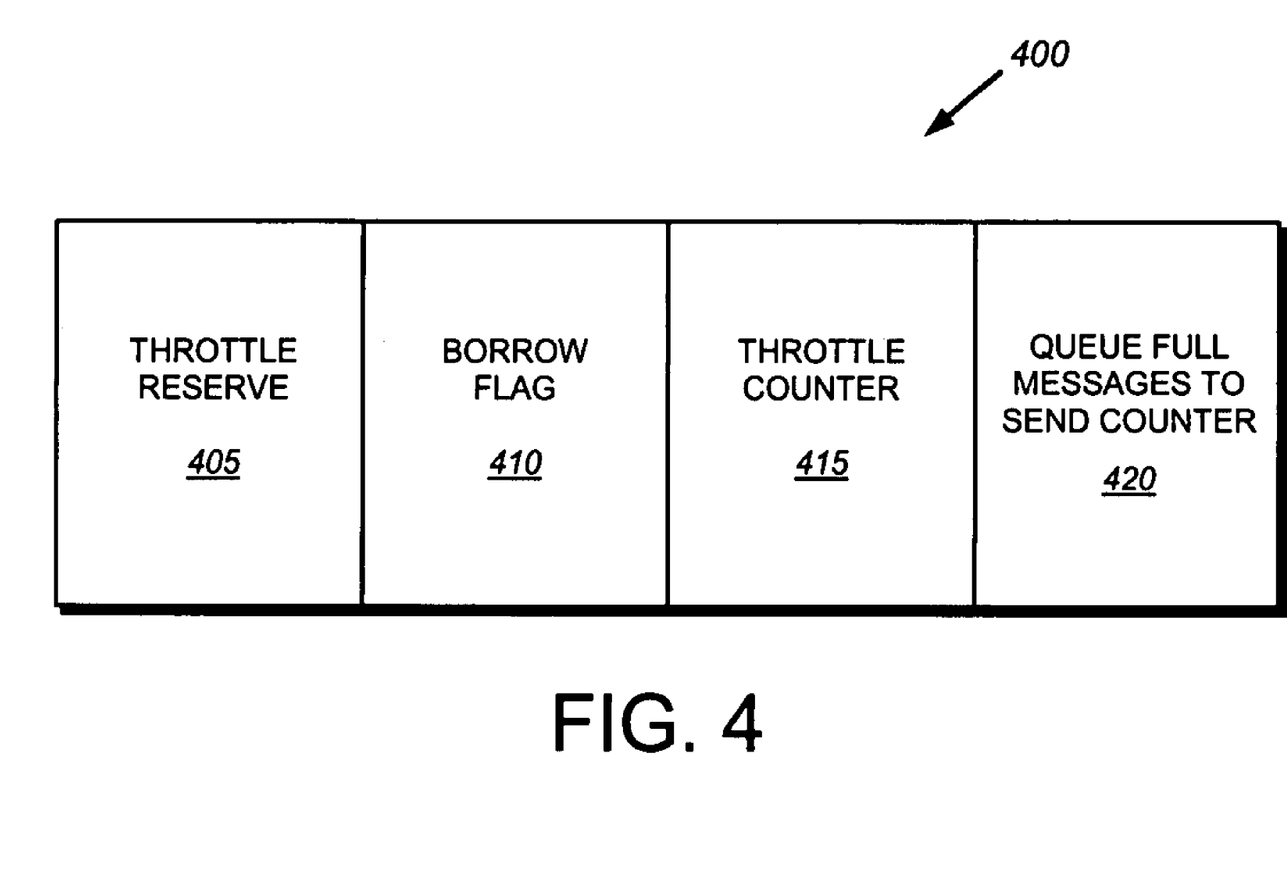
FIG. 4 is a schematic block diagram of an exemplary master throttle data structure is in accordance with an embodiment of the present invention.

FIG. 4 is a schematic block diagram of master throttle data structure is utilized by the storage operating system to configure throttle limits on igroups that do not have igroup-specific configured throttles set. The master throttle data structure 400 includes fields where a throttle reserve 405, a borrow flag field 410 and a throttle counter field 415. The throttle reserve field 405 identifies a number of queues available for use by the master throttle. The state of a borrow flag in field 410 identifies whether igroups associated with the master throttle may utilize queues in excess of the number of queues specified in the throttle reserve field 405 if there are available queues. In the exemplary embodiment, the borrow flag 410 for the master throttle is set to a value of NO, signifying that the storage system will not borrow queues for clients utilizing the master throttle. However, it is expressly contemplated that in alternate embodiments, the borrow flag may be set to a value of YES, whereby clients utilizing the master throttle may utilize unused queues from other throttles.

A throttle counter of field 415 is utilized by the SCSI throttle module for maintaining a up-to-date count of the number of queues utilized by the master throttle. In the illustrative embodiment, the SCSI throttle module 275 configures the throttle reserve field 405 in the master throttle data structure 400 to a value equal to all available queues that have not been previously reserved via an igroup throttle. For example, if the storage appliance has 1024 queues of which 512 have been allocated to igroups as igroup throttle values, then the master throttle data structure would have a throttle reserve value of 512. The counter for the number of queue full messages to send 420 is utilized by the SCSI throttle module to track the number of remaining queue full messages to send to clients after a throttle value has been exceeded.

Figure 5:
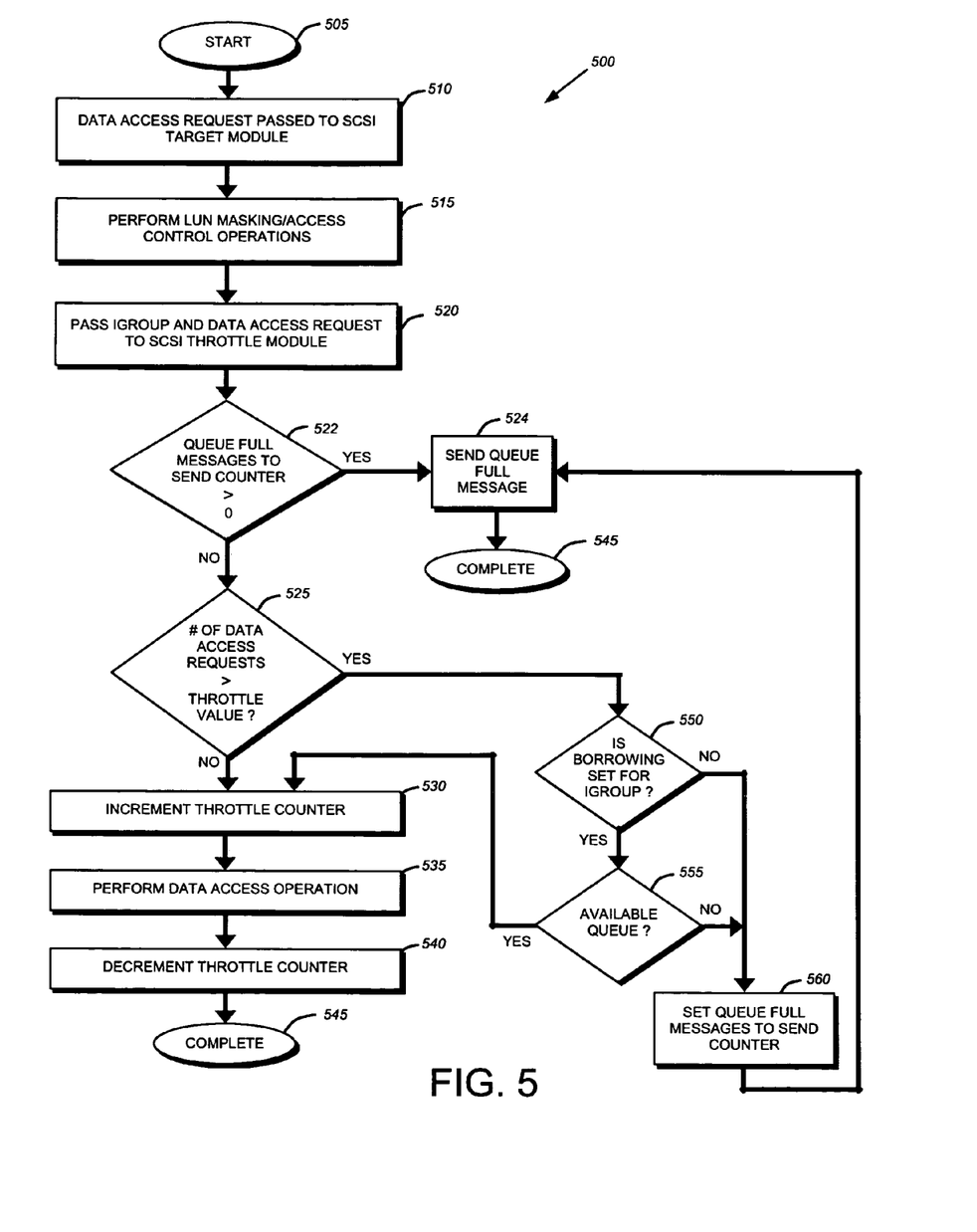
FIG. 5 is a flow chart illustrating a sequence of throttling technique in accordance with the present invention.

FIG. 5 is a flowchart illustrating a sequence of steps 500 performed by the storage operating system when processing received data access requests in accordance with the throttle technique of the present invention. The sequence 500 begins in step 505 and continues to step 510 where the data access request is passed to the SCSI target module 260 of the storage operating system, typically from the FC driver of the storage operating system. However, in alternate embodiments, the data access request may be passed from another driver within the storage operating system. For example, if the storage appliance is utilizes a TCP/IP offload engine (TOE) or an iSCSI HBA, which shares similar queue limitations as FC HBAs, then the data access request may be passed from the iSCSI drive 228 layer of the storage operating system.

The SCSI target module performs appropriate lun masking and/or other access control operations in step 515. Such operations may include obtaining an appropriate igroup data structure 300 and identifying whether the requesting client may access the desired lun. Lun masking is further described in U.S. patent application Ser. No. 10/619,122, entitled SYSTEM AND METHOD FOR OPTIMIZED A LUN MASKING, by Herman Lee, et al. Once the lun masking or other access control operations have been performed, the igroup and data access request are passed to the SCSI throttle module (step 520). This may be performed, by example, calling a function within the SCSI target module 260 wherein the function embodies the operations to be performed by the SCSI throttle module.

Then, in step 522, the SCSI throttle module determines if the counter for the number of queue full messages to send for the particular throttle is greater than zero. This may occur when, for example, the throttle counter had been exceeded but the appropriate number of queue full messages have not been sent in response to incoming data access requests. If the counter is greater than zero, the SCSI throttle module send, in step 524, a queue full message and decrements the queue full messages to send counter by one and then completes (step 545).

If the counter for the number of queue full messages to send is not greater than zero, the procedure continues and, in step 525, the SCSI throttle module determines whether the number of outstanding data access requests is greater than the throttle value for the igroup. This may be accomplished by examining the throttle counter within the igroup data structure. If there is no throttle value configured for the particular igroup, i.e., no throttle has been set for the particular igroup, then the SCSI throttle module utilizes the master throttle data structure 400 to determine if the number of queues consumed by execution of the data access request exceeds the appropriate throttle value. If the number of queues does not exceed the throttle value, then, in step 530, the throttle counter in the igroup is incremented. This ensures that the correct count is maintained within the igroup while the data access request is being processed by the storage operating system. In step 535, the SCSI target module performs the data access operation. Once the data access operation has been completed, the SCSI target module calls the SCSI throttle layer to decrement the throttle counter in step 540. The sequence then completes in step 545.

However, if in step 525 it is determined that the number of data access requests exceeds the throttle value set for the igroup, the procedure branches to step 550 to determine if the borrowing flag is set for the igroup. If the borrowing flag is set in step 550, the sequence continues to step 555 where the SCSI throttle module determines if there are any available queues by the data access request. A queue may be available when, for example, another client of the storage appliance is not utilizing their full throttle value number of queues. In the illustrative embodiment, queues are only borrowed from the master throttle. However, it is expressly contemplated that in alternate embodiments, queues may be borrowed from any throttle that is not utilizing all of its reserved queues. If a queue is available the SCSI throttle module allocates one of the unused queues for executing the data access request and branches to step 530 to increment the throttle counter. Once the throttle counter has been incremented, the data access request is operated upon as if the data access request did not exceed the throttle value.

If borrowing is not set for the igroup or if there are not sufficient queues available to process the data access request, then the SCSI throttle module continues to step 560 and sets the appropriate queue full messages to send counter to N for the throttle. In the illustrative embodiment, the value of N is set as a percentage of the total number queues available, for example, 20 percent of all queues. This queue full message is returned to the next N data access request operations received regardless of which client associated with the throttle originated the data access request operation. In the illustrative embodiment, the queue full messages are sent in response to the next N data access requests sent by clients that are in the igroup associated with the throttle that has been exceeded. In alternate embodiments, the value of N may be set manually by an administrator. Upon receipt of a queue full message, clients reduce the issuance of their data access requests. This may be accomplished by, for example, inserting wait states before sending a data access request to the storage appliance. As clients slow their data access rates, the storage appliance can free queues as it is not receiving as many data access requests, and thereby avoid starvation problems. This permits less active clients to utilize the services of the storage appliance. Once the counter has been set in step 560, the procedure loops to step 524 to send a queue full message in response to the current data access request before completing in step 545.

Throttles may be configured (set) for a specific igroup through the use of an igroup command implemented in a command line interface (CLI) of the storage operating system. The igroup command is further described in the above-referenced U.S. Pat. No. 7,293,152, entitled CONSISTENT LOGICAL NAMING OF INITIATOR GROUPS, by Mohan Srinivason, et al. An example of the igroup command is:

igroup set <initator_group> throttle_reserve <X> wherein <initator_group> indicates the name of the igroup and X indicates the number of queues reserved for the igroup. An error message is returned if an administrator attempts to set a throttle value to a number larger than the available queues associated with an adapter (HBA). The igroup command is processed by the virtualization system to set the appropriate throttle reserve values in the igroup data structure and updates the master throttle data structure accordingly.

Another option for the igroup command is:

igroup set <initator_group> throttle_borrow <Y|N> that sets the borrowing flag for the specified igroup. In the illustrative embodiment, igroups default to not being able to borrow free queues for processing data access requests.

When the present invention is utilized in a storage cluster environment, such as that described in U.S. Pat. No. 7,039,828, entitled SYSTEM AND METHOD FOR CLUSTERED FAILOVER WITHOUT NETWORK SUPPORT, by John A. Scott, issued on May 2, 2006, the throttle values may be modified during a takeover operation depending on the cluster configuration. When a surviving storage appliance activates a second port to service data access requests normally directed to a failed storage appliance, the appropriate throttle values for the failed storage appliance will be applied to the port(s) being utilized for servicing data access requests directed to the failed storage appliance. Thus, the surviving storage appliance's throttles are utilized on those ports accepting data access requests directed to the surviving storage appliance and the failed storage appliance's throttles are utilized on those pots accepting data access requests directed to the failed storage appliance.

If virtual ports are being utilized during cluster operation then during a takeover operation, each storage appliance will have all of their throttle values halved, if both storage appliances are utilizing throttles. This evenly splits the available bandwidth of the physical port between the virtual ports associated therewith. Virtual ports are described in U.S. patent application Ser. No. 10/672,260, entitled SYSTEM AND METHOD FOR FAILOVER USING VIRTUAL PORTS IN CLUSTERED SYSTEMS, by Fang Wang et al. If only one of the storage appliances in the cluster is utilizing throttles, then there is no need to divide resources and during takeover each unreserved queue may be shared by any of the virtual ports.

If data access requests are received at a port that is to be proxied to a partner storage appliance, the data access request is counted in the queue associated with the port that received the data access request. Proxying data access requests is further described in U.S. Patent Application Ser. No. 60/534,909, entitled SYSTEM AND METHOD FOR PROXYING DATA ACCESS COMMANDS IN A CLUSTERED STORAGE SYSTEM, by Herman Lee. et al. Thus, until the data access request is proxied, and a final response is sent to the requesting client, the data access request occupies one of the queue slots associated with a throttle.

To again summarize, the present invention provides a technique for reducing issuance of data access rates to data containers, such as virtual disks served by the storage appliance. The system and method obviates the need to individually and manually configure each client associated with the storage appliance. The storage operating system provides an igroup command that permits administrators to set a throttle value for each igroup associated with the storage appliance. When the storage appliance receives a data access request, the request is forwarded to a SCSI target module of the storage operating system. The SCSI target module, in turn, forwards the request, along with the igroup data structure associated with the originating client, to a SCSI throttle module. The SCSI throttle module determines if the received data access request will cause the igroup to consume queues in excess of the number of queues specified by the throttle value. If the throttle value is exceeded, the SCSI throttle module determines if borrowing flag is set for the igroup and, if so determines if there are available queues for use in processing the data access request. If so, the data access request is processed using the free queues.

If there are no free queues, or if the borrow flag is not set for the igroup, the SCSI throttle module sends a queue full message in response to the next N data access requests received by the storage appliance, regardless of which client in the igroup originates the requests. The value of N is typically set as a percentage of the total number of queues available. Clients, upon receiving a queue full message, will slow their data input/output (I/O) rate, which alleviates the overloaded status of the storage appliance.

The foregoing description has been directed to specific embodiments of this invention. It will be apparent, however, that other variations and modifications may be made to the described embodiments, with the attainment of some or all of their advantages. Specifically, it should be noted that any number of NIC/HBAs may be utilized in accordance with the invention. While the description has been written in terms of HBAs on FC, the principles of the present invention may be expanded to other queue-based protocols and adapters such as, for example, iSCSI using a TCP/IP offload engine (TOE). Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for reducing issuance of data access requests to a storage system from clients of the storage system, comprising:
   configuring a first group of clients with a first predetermined number of queues that may be utilized by the clients in the first group, the predetermined number hereinafter a throttle value, and a second group of clients with a second throttle value;
   receiving, by the storage system, a data access request from a client of the first group;
   determining that execution of the received data access request will cause the throttle value of the first group of clients to be exceeded;
   determining if the client of the first group may use an available queue from the second group of clients, where the second group of clients has not exceeded its throttle value;
   sending, if the client of the first group may not use the available queue from the second group, a queue full message to the client of the first group; and
   reducing, in response to the queue full message, issuance of the data access requests from the first group to the storage system.

2. The method of claim 1 further comprising, in response to determining that the data access request exceeds the throttle value,
   determining if a borrowing flag is set to determine if an available queue may be borrowed.

3. The method of claim 2 further comprising, in response to the borrowing flag not being set or no queue being available, sending N queue full messages to a next N received data access requests.

4. The method of claim 3 wherein N is calculated as a predetermined percentage of a total number of available queues.

5. The method of claim 1 further comprising:
   performing, if the client of the first group may use the available queue from the second throttle value of the second group of clients, the pending data access request using the available queue.

6. The method of claim 5 further comprising:
   incrementing a master throttle counter; and
   decrementing the master throttle counter, in response to performing the pending data access request.

7. The method of claim 6 further comprising:
   using the master throttle counter in determining the number of Pending data access requests.

8. The method of claim 1 wherein the throttle value is associated with a particular initiator group.

9. The method of claim 1 wherein the throttle value is associated with a particular client of the storage system.

10. The method of claim 1 wherein the storage system comprises a storage appliance.

11. The method of claim 1 wherein a throttle counter is contained within an initiator group data structure.

12. A storage system for reducing issuance of data access requests to the storage system from the clients of the storage system, comprising:
    means for configuring a first group of clients with a first predetermined number of queues that may be utilized by the clients in the first group, the predetermined number hereinafter a throttle value, and a second group of clients with a second throttle value;
    means for receiving, by the storage system, a data access request from a client of the first group;
    means for determining that execution of the received data access request will cause throttle value of the first group of clients to be exceeded;
    means for determining if the client of the first group may use an available queue from the second group of clients, where the second group of clients has not exceeded its throttle value;
    means for sending, if the client of the first group may not use the available queue from the second group, a queue full message to the client of the first group; and
    means for reducing, in response to the queue full message, issuance of the data access requests from the first group to the storage system.

13. The storage system of claim 12 further comprising:
    means for determining if a borrowing flag is set to determine that an available queue may be borrowed.

14. The storage system of claim 13 further comprising means for sending N queue full messages to a next N received data access requests in response to determining that the borrowing flag is not set or no queue being available.

15. The storage system of claim 14 wherein N is calculated as a predetermined percentage of a total number of available queues.

16. The storage system of claim 12 wherein the throttle value is associated with a particular initiator group.

17. The storage system of claim 12 wherein the throttle value is associated with a particular client of the storage system.

18. The storage system of claim 12 wherein the storage system comprises a storage appliance.

19. A storage system for reducing issuance of data access requests from clients, comprising:
    the storage system having a target module adapted to interpret data access requests from one or more clients;
    a throttle module adapted to determine that a number of data access requests will exceed a predetermined throttle value of pending data access requests for the one or more clients;
    the throttle module further adapted to determine if the one or more client may use an available queue from another client that has not exceeded its predetermined throttle value; and
    in response to the determination that no queue from the another client is available, the throttle module further adapted to reduce issuance of the data access requests from the one or more clients.

20. The storage system of claim 19 wherein the throttle module is further adapted to determine if a borrowing flag is set and to determine if a queue is available.

21. The storage system of claim 20 wherein the throttle module is further adapted to send N queue full messages in response to determining that the borrowing flag is not set or if no queue is available.

22. The storage system of claim 21 wherein the N queue full messages are sent in response to a next N received data access requests.

23. The storage system of claim 19 wherein the throttle module is further adapted to modify throttle values as a result of a failover operation.

24. The storage system of claim 23 wherein the throttle module is further adapted to half each throttle value when virtual ports are associated with physical ports during the failover operation.

25. The storage system of claim 19 wherein the throttle module further comprises a master throttle associated with clients that are not associated with another throttle.

26. The storage system of claim 19 further comprises a master throttle associated with one or more queues that are not associated with another throttle associated with the storage system.

27. The storage system of claim 19 wherein the throttle module is further adapted to count a received data access request to be proxied to a partner storage system against the throttle value.

28. A computer readable media, comprising:
said computer readable media containing instructions for execution on a processor for the practice of a method for reducing issuance of data access requests to a storage system, the method having,
configuring a first group of clients with a first predetermined number of queues that may be utilized by the clients in the first group, the predetermined number hereinafter a throttle value, and a second group of clients with a second throttle value;
receiving, by the storage system, a data access request from a client of the first group;
determining that execution of the received data access request will cause the throttle value of the first group of clients to be exceeded;
determining if the client of the first group may use an available queue from the second group of clients, where the second group of clients another client that has not exceeded its throttle value;
sending, if the client of the first group may not use the available queue from the second group, a queue full message to the client of the first group; and
reducing, in response to the queue full message, issuance of the data access requests from the first group to the storage system.

29. A method for reducing issuance of data access requests to a storage system from a plurality of clients of the storage system, comprising:
receiving one or more data access requests from the plurality of clients;
associating a plurality of queues with a first initiator group;
determining if the received data access requests causes a number of data access requests to exceed a predetermined throttle value associated with the first initiator group;
in response to determining that the number of data access requests exceeds the throttle value associated with the first initiator group,
(i) determining if any queues are available from another initiator group;
(ii) borrowing the available queues from the another initiator group; and
(iii) performing the data access requests using the available queues.

30. The method of claim 29 further comprising, in response to determining that the number of data access requests exceeds the throttle value, determining if a borrowing flag is set.

31. The method of claim 30 further comprising, in response to the borrowing flag not being set or no queue being available, sending N queue full messages to a next N received data access requests.

32. The method of claim 29 further comprising:
incrementing a throttle counter;
performing the data access requests; and
decrementing the throttle counter.

33. A method for reducing issuance of data access requests to a storage system from a plurality of clients of the storage system, comprising:
receiving one or more data access requests from a first plurality of clients;
associating a first plurality of queues with a first initiator group;
associating a second plurality of queues with a second initiator group;
determining if the received data access requests from the first plurality of clients causes a number of data access requests to exceed a predetermined throttle value associated with the first initiator group;
in response to determining that the number of data access requests exceeds the throttle value associated with the first initiator group,
(i) determining if any queues are available from the second initiator group;
(ii) borrowing the available queues from the second plurality of queues for use with the first plurality of queues associated with the first initiator group; and
(iii) performing the data access requests using the second plurality of available queues.

34. The method of claim 33 further comprising, in response to determining that the number of data access requests exceeds the throttle value, determining if a borrowing flag is set.

35. The method of claim 34 further comprising, in response to the borrowing flag not being set or no queue being available, sending N queue full messages to a next N received data access requests.

36. The method of claim 33 further comprising:
incrementing a throttle counter;
performing the data access requests; and
decrementing the throttle counter.

37. A method for reducing issuance of data access requests to a storage system from a plurality of clients of the storage system, comprising:
receiving one or more data access requests from the plurality of clients;
associating a plurality of queues with a first initiator group;
determining if the received data access requests causes a number of data access requests to exceed a predetermined throttle value associated with the first initiator group;
in response to determining that the number of data access requests exceeds the throttle value associated with the first initiator group,
(i) determining if a borrowing flag is set;
(ii) determining if any queues are available from another initiator group;
(iii) borrowing the available queues from the another initiator group; and
(iv) performing the data access requests using the available queues.

38. The method of claim 37 further comprising, in response to the borrowing flag not being set or no queue being available, sending N queue full messages to a next N received data access requests.

39. A method for reducing issuance of data access requests to a storage system from clients of the storage system, comprising:
configuring a first group of clients with a first predetermined number of queues that may be utilized by the clients in the first group, the predetermined number hereinafter a throttle value;

configuring a second group of clients with a second throttle value;

determining that execution of a next data access request sent from the first client group will cause the first throttle value of the first group of clients to be exceeded; and reducing issuance of the data access requests, if the first group of clients may not use a queue from the second group of clients to execute the next data access request.

40. The method of claim 39 further comprising:

sending, if the first group of clients may not use the queue from the second group of clients, a queue full message indicating the first group of clients may not use the queue from the second group of clients.

* * * * *

UNITED STATES PATENT AND TRADEMARK OFFICE
CERTIFICATE OF CORRECTION

| | | |
|---|---|---|
| PATENT NO. | : 7,529,836 B1 | Page 1 of 1 |
| APPLICATION NO. | : 10/753750 | |
| DATED | : May 5, 2009 | |
| INVENTOR(S) | : David Brittain Bolen | |

It is certified that error appears in the above-identified patent and that said Letters Patent is hereby corrected as shown below:

In Col. 1, line 57 should read as follows:
  and its storage devices. The SAN may thus be ~~is~~ viewed as an In Col. 3, line 7 should read as follows:
  igroup containing the requesting client to ~~is~~ the SCSI throttle In Col. 3, line 53 should read as follows:
  ter throttle data structure ~~is~~ in accordance with an embodi-

In Col. 6, line 64 should read as follows:
  tem, which is implemented as a microkernel. The ~~is~~ storage In Col. 10, line 6 should read as follows:
  appliance ~~is~~ utilizes a TCP/IP offload engine (TOE) or an In Col. 12, line 2 should read as follows:
  utilized on those ~~pots~~ ports accepting data access requests directed In Col. 15, line 29 should read as follows:
  the second group of clients ~~another client that~~ has not Signed and Sealed this
Twenty-fourth Day of July, 2012

David J. Kappos
*Director of the United States Patent and Trademark Office*